United States Patent
Nakajo et al.

(10) Patent No.: US 11,542,205 B2
(45) Date of Patent: Jan. 3, 2023

(54) MANUFACTURING METHOD OF HONEYCOMB STRUCTURE

(71) Applicant: NGK INSULATORS, LTD., Nagoya (JP)

(72) Inventors: Makoto Nakajo, Nagoya (JP); Toshihiro Fukui, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 708 days.

(21) Appl. No.: 15/918,147

(22) Filed: Mar. 12, 2018

(65) Prior Publication Data

US 2018/0273433 A1 Sep. 27, 2018

(30) Foreign Application Priority Data

Mar. 24, 2017 (JP) .............................. JP2017-059057

(51) Int. Cl.
*B28B 3/20* (2006.01)
*C04B 35/622* (2006.01)
(Continued)

(52) U.S. Cl.
CPC ............ *C04B 38/0006* (2013.01); *B28B 3/20* (2013.01); *B28B 17/026* (2013.01); *B28C 5/003* (2013.01);
(Continued)

(58) Field of Classification Search
CPC ... B28B 2003/203; B28B 3/20; B28B 17/026; C04B 35/62204; C04B 38/0006;
(Continued)

(56) References Cited

U.S. PATENT DOCUMENTS

| | | | |
|---|---|---|---|
| 4,851,376 A | 7/1989 | Asami et al. | |
| 5,296,423 A * | 3/1994 | Locker | ................. C04B 35/195 264/176.1 |

(Continued)

FOREIGN PATENT DOCUMENTS

| | | |
|---|---|---|
| CN | 1956934 A | 5/2007 |
| DE | 10 2004 043 250 A1 | 5/2005 |

(Continued)

OTHER PUBLICATIONS

Japanese Office Action (Application No. 2017-059057) dated Jul. 9, 2019 (with English translation).

(Continued)

*Primary Examiner* — Francisco W Tschen
*Assistant Examiner* — Edgaredmanuel Troche
(74) *Attorney, Agent, or Firm* — Burr & Brown, PLLC

(57) ABSTRACT

A manufacturing method of a honeycomb structure including:
a dry mixing step of dry-mixing raw materials to form the honeycomb structure by a batch treatment,
a wet mixing step of adding a liquid including at least one selected from the group consisting of water, a surfactant, a lubricant and a plasticizer to a dry mixture obtained in the dry mixing step, to perform wet mixing,
a kneading step of kneading a wet mixture obtained in the wet mixing step, and
a forming step of extruding a forming material prepared in the kneading step,
wherein in the dry mixing step, a used forming material passed through the forming step is added as a part of the raw material, to perform dry mixing, and
the kneading step includes a liquid re-adding step of further adding the liquid in a process of kneading the wet mixture.

3 Claims, 4 Drawing Sheets

(51) Int. Cl.
  *B28B 17/02* (2006.01)
  *B28C 7/02* (2006.01)
  *C04B 35/626* (2006.01)
  *C04B 38/00* (2006.01)
  *B28C 5/00* (2006.01)
  *C04B 35/195* (2006.01)

(52) U.S. Cl.
  CPC ............ *B28C 7/026* (2013.01); *C04B 35/195* (2013.01); *C04B 35/6263* (2013.01); *C04B 35/62204* (2013.01); *B28B 2003/203* (2013.01); *C04B 2235/6021* (2013.01); *C04B 2235/94* (2013.01)

(58) Field of Classification Search
  CPC ............ C04B 35/195; C04B 35/6263; C04B 2235/6021; C04B 2235/94; B28C 5/003; B28C 7/026
  USPC .................................................... 264/177.12
  See application file for complete search history.

(56) References Cited

U.S. PATENT DOCUMENTS

| | | | | |
|---|---|---|---|---|
| 5,679,292 | A * | 10/1997 | Nisimura | ............ C04B 35/195 |
| | | | | 264/681 |
| 8,974,724 | B2 * | 3/2015 | Day | ...................... C04B 35/478 |
| | | | | 264/638 |
| 2004/0115392 | A1 | 6/2004 | Miyakawa | |
| 2004/0151872 | A1 | 8/2004 | Makino | |
| 2005/0069675 | A1 * | 3/2005 | Noguchi | ............ C04B 38/0006 |
| | | | | 428/116 |
| 2005/0221053 | A1 | 10/2005 | Tomita et al. | |
| 2006/0257620 | A1 * | 11/2006 | Noguchi | ............ B01D 46/0001 |
| | | | | 428/116 |
| 2012/0096821 | A1 * | 4/2012 | Nemoto | ............... C01G 23/003 |
| | | | | 55/523 |
| 2016/0288366 | A1 * | 10/2016 | Tajima | .............. C04B 35/62625 |
| 2016/0288367 | A1 * | 10/2016 | Tajima | .................... B28C 9/002 |

FOREIGN PATENT DOCUMENTS

| | | |
|---|---|---|
| EP | 3 075 717 A1 | 10/2016 |
| JP | H03-072032 B2 | 11/1991 |
| JP | 2004-188819 A1 | 7/2004 |
| JP | 2004-224659 A1 | 8/2004 |
| JP | 2005-126317 A | 5/2005 |
| JP | 2016-193589 A1 | 11/2016 |
| WO | 2005/018893 A1 | 3/2005 |

OTHER PUBLICATIONS

Japanese Offer of Information Form (with English translation), Japanese Application No. 2017-059057, dated Jul. 4, 2019 (6 pages).

German Office Action (with English translation), German Application No. 10 2018 204 468.6, dated Oct. 27, 2021 (11 pages).

Chinese Office Action (with English translation), Chinese Application No. 201810237066.0, dated Jun. 29, 2020 (11 pages).

\* cited by examiner

MANUFACTURING METHOD OF HONEYCOMB STRUCTURE

The present application is an application based on JP-2017-059057 filed on Mar. 24, 2017 with Japan Patent Office, the entire contents of which are incorporated herein by reference.

BACKGROUND OF THE INVENTION

Field of the Invention

The present invention relates to a manufacturing method of a honeycomb structure, and more particularly, it relates to a manufacturing method of a honeycomb structure in which when a forming material to manufacture the honeycomb structure is prepared, it is possible to set a high reuse ratio of a used forming material extruded once.

Description of the Related Art

Heretofore, honeycomb structures made of ceramics have been used in various broad use applications to a car exhaust gas purifying catalyst carrier, a diesel particulate removing filter, a gasoline particulate removing filter, and a heat reservoir for a burning device. Here, such a ceramic honeycomb structure (hereinafter referred to simply as "the honeycomb structure") is manufactured by extruding a material from an extruding die to obtain a honeycomb formed body in a honeycomb formed body manufacturing device, and then, firing the honeycomb formed body at a high temperature by use of a firing furnace to obtain the honeycomb structure. Consequently, there is obtainable the honeycomb structure including porous partition walls which define a plurality of cells extending from one end face to the other end face to form through channels for a fluid.

In a forming step of forming the honeycomb formed body by the extrusion, an extruder including the extruding die attached to its extrusion port is used, to extrude the forming material while controlling an extrusion pressure and an extrusion speed in a state where an extruding direction is matched with a horizontal direction.

In the forming material, various ceramic particles, a binder and the like are used as raw materials. For the purpose of enabling the extrusion from the extruder, water and/or a liquid of a surfactant or the like is added to the raw materials to obtain a viscosity suitable for the extrusion, and the forming material having the viscosity is prepared through a mixing step and a kneading step. In the mixing step, powdered or powdery raw materials weighed at prescribed blend ratios are initially dry-mixed by using a batch mixer (first mixing), and then, the liquid (water or the like) is added, to perform wet mixing (second mixing), thereby obtaining a wet mixture (a forming mixture) (e.g., see Patent Document 1). Afterward, through a kneading step of kneading the wet-mixed wet mixture (the forming mixture), the forming material prepared suitably for the extrusion is extruded from the extruder (a forming step).

[Patent Document 1] WO 2005/018893 (A1)

SUMMARY OF THE INVENTION

In a process of manufacturing a honeycomb structure, for the purpose of confirming a formed body shape and the like of a honeycomb formed body immediately after the honeycomb formed body is extruded, a part of the honeycomb formed body is extracted from a manufacturing line, and roundness of the honeycomb formed body, deviation of an extrusion speed or a quality of bend or the like of the honeycomb formed body is confirmed.

Measurement of each part of the honeycomb formed body extracted for the quality confirmation and the like are performed, and then, the honeycomb formed body is recovered and temporarily stored in a recovering box or the like installed beforehand, without being returned again to the manufacturing line. Immediately after the start of a forming step of the honeycomb formed body, an extruder is repeatedly operated and stopped, and it is occasionally checked a plurality of times whether or not a prescribed quality of the shape of the formed body is acquired. Therefore, an amount of the honeycomb formed body to be recovered in the recovering box or the like especially increases.

Furthermore, cutting chips are generated when the extruded continuous honeycomb formed body is cut in predetermined honeycomb lengths. Alternatively, when the honeycomb formed body is dried and end faces thereof are ground to improve a dimensional accuracy, cutting chips, grinding powder and the like are generated. The cutting chips, the grinding powder and the like are similarly recovered. The honeycomb formed body and the cutting chips, the grinding powder and the like of the forming material passed through the extruder (hereinafter referred to as "the used forming material") have an unfired state, and are usable as a part of a raw material of the forming material again.

Therefore, in a mixing step (especially, first mixing), "the used forming material" recovered as a part of the raw material is usually added, when ceramic particles and the like are mixed. Consequently, the used forming material can be recycled without being discarded, and effective utilization of resources is achievable.

However, the recycling of the used forming material might cause defects as follows. Specifically, it is known that when a ratio of the used forming material to be added to the raw material including the ceramic particles and others, i.e., a mass ratio (="a reuse ratio") of an amount of the used forming material to be reused to a total amount of a dry mixture in a dry mixing step increases, more agglomerates, i.e., so-called "lumps" are generated. When inhomogeneous portions such as the agglomerates are present in the forming material, stability of the extrusion is impaired.

It is considered that the used forming material has a large particle surface area and therefore easily selectively absorbs a liquid such as water, and this is supposed because the agglomerates of the inhomogeneous portions grow easily in a wet-mixing step. Alternatively, it is considered that in the surface of the used forming material, there is the strong tendency that a binder or the like segregates, and the binder or the like easily adsorbs water or the like, and is therefore a factor of the generation of the agglomerates.

Therefore, the reuse ratio of the used forming material is often limited to a certain range (e.g., less than 20 mass % or the like). Consequently, a total amount of the recovered used forming material is not completely usable as the raw material of the forming material, and a part of the used forming material might be discarded. As a result, a part of the forming material might be wasted, an increase of raw material cost might be incurred, and finally, there might occur, for example, the problem that manufacturing cost of the honeycomb structure increases.

On the other hand, it is known that in the mixing step of mixing the raw materials including the used forming material, an amount of the liquid to be added has a large influence on the forming material, to cause the generation of the agglomerates, fluctuation in viscosity, and the like. Furthermore, due to the generation of the agglomerates, the fluctuation in viscosity and the like, an excessively large torque might be applied to the extruder in the subsequent forming step, or the extrusion speed might be destabilized. In consequence, a quality stability of a product shape or the like of the honeycomb structure of a final product, a productivity or the like might raise a problem.

Heretofore, for the purpose of enabling stabilized extrusion, close attention has been paid to the amount of the liquid to be added to the forming material. However, the liquid is often added only in wet mixing (a wet mixing step) that is the above-mentioned second mixing, and the liquid is hardly added in the subsequent kneading step or the like. Here, much time is taken from the wet mixing step through the kneading step to the forming step of extruding the forming material.

Consequently, when an abnormality is recognized in the formed body shape of the honeycomb formed body during the extrusion, the amount of the liquid to be added is immediately adjusted in the wet mixing step, but even in this case, there is a time lag until an effect of this adjustment is confirmed, and hence, rapid response and the confirmation of the effect might not be achievable.

To eliminate the problems, the present invention has been developed in view of the above-mentioned actual circumstances, and an object thereof is to provide a manufacturing method of a honeycomb structure in which a reuse ratio of a used forming material is increased while inhibiting generation of agglomerates, wasteful consumption of the forming material is eliminated, and an effect obtained by adding a liquid can immediately be confirmed, thereby enabling formation of a honeycomb formed body and manufacturing of the honeycomb structure with high quality stabilities.

According to the present invention, there is provided a manufacturing method of a honeycomb structure as follows.

According to a first aspect of the present invention, a manufacturing method of a honeycomb structure is provided including a dry mixing step of dry-mixing raw materials to form the honeycomb structure by a batch treatment, a wet mixing step of adding a liquid including at least one selected from the group consisting of water, a surfactant, a lubricant and a plasticizer to a dry mixture obtained in the dry mixing step, to perform wet mixing, a kneading step of kneading a wet mixture obtained in the wet mixing step, and a forming step of extruding a forming material prepared in the kneading step, wherein in the dry mixing step, a used forming material passed through the forming step is added as a part of the raw material, to perform dry mixing, and the kneading step includes a liquid re-adding step of further adding the liquid in a process of kneading the wet mixture.

According to a second aspect of the present invention, the manufacturing method of the honeycomb structure according to the above first aspect is provided, wherein a reuse ratio indicating a mass ratio of the used forming material in a total amount of the dry mixture is in a range of 20 mass % to 60 mass %.

According to a third aspect of the present invention, the manufacturing method of the honeycomb structure according to the above first or second aspects is provided, wherein a ratio of an amount of the liquid to be added in the liquid re-adding step is in a range of 2 mass % to 10 mass %, when a ratio of a total amount of the dry mixture is 100 mass %.

According to a manufacturing method of a honeycomb structure of the present invention, in two liquid re-adding steps included in a dry mixing step and a kneading step, liquids are addable to a dry mixture and a wet mixture, respectively. A part of the liquid is added in the kneading step immediately prior to a forming step, so that a viscosity of a forming material or the like is finely adjustable. In particular, a ratio of an amount of the liquid to be added in the wet mixing step is decreased, so that the kneading step of the next step can be performed in a state where generation of agglomerates in the forming material is minimized, and the forming material is suitably adjustable. Consequently, a high reuse ratio of a used forming material can be set, and the forming material is not wasted.

Furthermore, also when an abnormality is confirmed in a formed body shape of an extruded honeycomb formed body, the liquid is added immediately prior to the forming step, so that rapid response is achievable, and an effect of the addition of the liquid can be grasped more rapidly than in a conventional technology.

DESCRIPTION OF THE PREFERRED EMBODIMENTS

Hereinafter, description will be made as to an embodiment of a manufacturing method of a honeycomb structure of the present invention with reference to the drawings. The present invention is not limited to the following embodiments, and changes, modifications, improvements and the like are addable without departing from the gist of the present invention.

Figure 1:
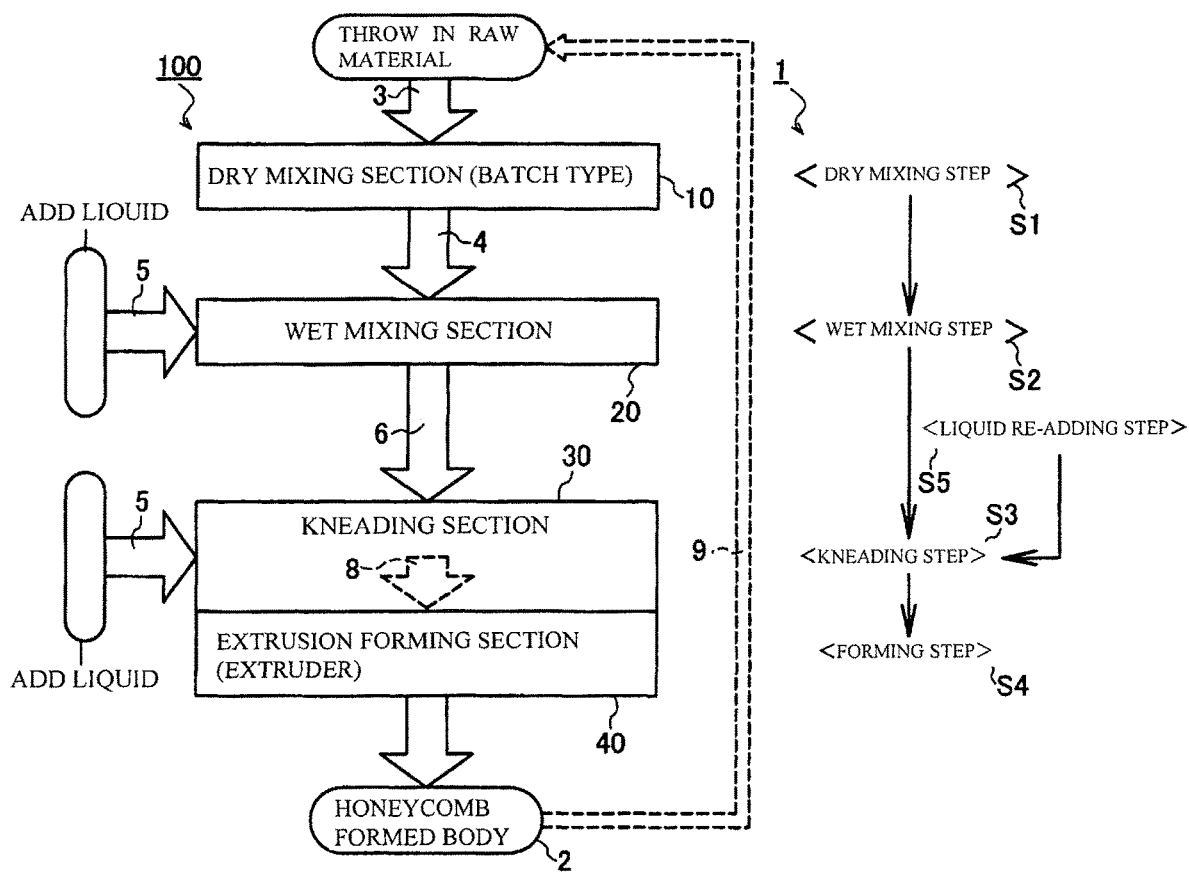
FIG. 1 is an explanatory view schematically showing an outline constitution of a manufacturing method of a honeycomb structure of one embodiment of the present invention.

The manufacturing method of the honeycomb structure according to one embodiment of the present invention (hereinafter referred to simply as "a manufacturing method 1") is concerned with an extrusion treatment of a honeycomb formed body 2 to be prepared for manufacturing of a honeycomb structure (not shown) as shown in FIG. 1 or the like, and the method mainly includes a dry mixing step S1 of dry-mixing a plurality of types of raw materials 3 constituted of powdered or powdery ceramic powder bodies 3a, binders 3b and others, a wet mixing step S2 of adding a liquid 5 to an obtained dry mixture 4, to perform wet mixing by a batch treatment or a continuous treatment, a kneading step S3 of kneading an obtained wet mixture 6, and a forming step S4 of extruding a forming material 8 obtained by a deaeration and compaction treatment of an obtained kneaded material 7 by use of an extruder, to form a honeycomb formed body 2 in a desirable shape. It is to be noted that as the ceramic powder bodies 3a and others, well-known ceramic raw materials such as cordierite and silicon carbide are usable.

Particularly in the manufacturing method 1 of the present embodiment, the kneading step S3 further includes a liquid re-adding step S5 of further adding the liquid 5 in a process of kneading the wet mixture 6. Consequently, in a process of converting the raw material 3 to the forming material 8 to prepare the forming material 8 (see FIG. 2), the liquid 5 is addable in two stages of the wet mixing step S2 and the kneading step S3.

In other words, according to the manufacturing method 1 of the present embodiment, the raw material 3 includes "a used forming material 9" in addition to the ceramic powder bodies 3a, the binders 3b and others. Here, the used forming material 9 is a generic term of a part of the honeycomb formed body 2 which is extracted from a manufacturing line of the honeycomb formed body 2 (the honeycomb structure) to confirm a formed body shape of the extruded honeycomb formed body 2, extrusion conditions and the like and which is not sent to a firing step of and after the forming step S4 as described above, cutting chips or cutting powder cut or removed from the honeycomb formed body 2 to adjust a size of the honeycomb formed body 2, or grinding dust, grinding powder or the like generated by end face grinding to be performed after the honeycomb formed body 2 is dried.

That is, the used forming material passes through the forming step S4 of forming the honeycomb formed body 2 at least once, and is not fired. Therefore, the used forming material 9 is not exposed at a high firing temperature, and is reusable as a part of the raw material 3 of the forming material 8. As described above, the used forming material 9 is recovered in respective stages after the forming step S4 is performed and before the formed body is sent to the firing step, and such recovered used forming material 9 is mixed with the ceramic powder bodies 3a at a predetermined ratio, and reused.

The manufacturing method 1 of the present embodiment can be performed by using a honeycomb formed body manufacturing device 100 configured to perform the above steps S1 to S5 shown in FIG. 1. Here, the honeycomb formed body manufacturing device 100 mainly has a batch type of dry mixing section 10, a batch or continuous type of wet mixing section 20, a kneading section 30 and an extrusion forming section 40 as functional constitutions, and the kneading section 30 further includes a constitution (not shown) of a liquid column pump or the like to further add the liquid 5, in its constitutional elements. Hereinafter, description will be made as to a flow of the manufacturing method 1 of the present embodiment together with constitutions of the respective sections of the honeycomb formed body manufacturing device 100.

The extrusion forming section 40 corresponds to a heretofore used well-known extruder to form the honeycomb formed body 2 by extrusion. Furthermore, there are not any special restrictions on the liquid 5 to be added, but there is usable the liquid including only one or at least one selected from the group consisting of water, a surfactant, a lubricant and a plasticizer. The liquids 5 are added to the raw material 3 during mixing and during kneading, respectively, thereby obtaining the forming material 8 of a homogeneous continuous body having a viscosity suitable for the extrusion from the extrusion forming section 40.

The dry mixing step S1 is performed by using the batch type of dry mixing section 10 (a batch mixer). The raw material 3 includes the plurality of types of powdered or powdery ceramic powder bodies 3a and binders 3b which are weighed at the predetermined blend ratios, and the used forming material 9, and such a raw material is thrown into the dry mixing section 10 and is stirred and mixed in a stirring mechanism (not shown) so that the ceramic powder bodies 3a, the binders 3b and the used forming material 9 are uniformly mixed with one another.

Figure 2:
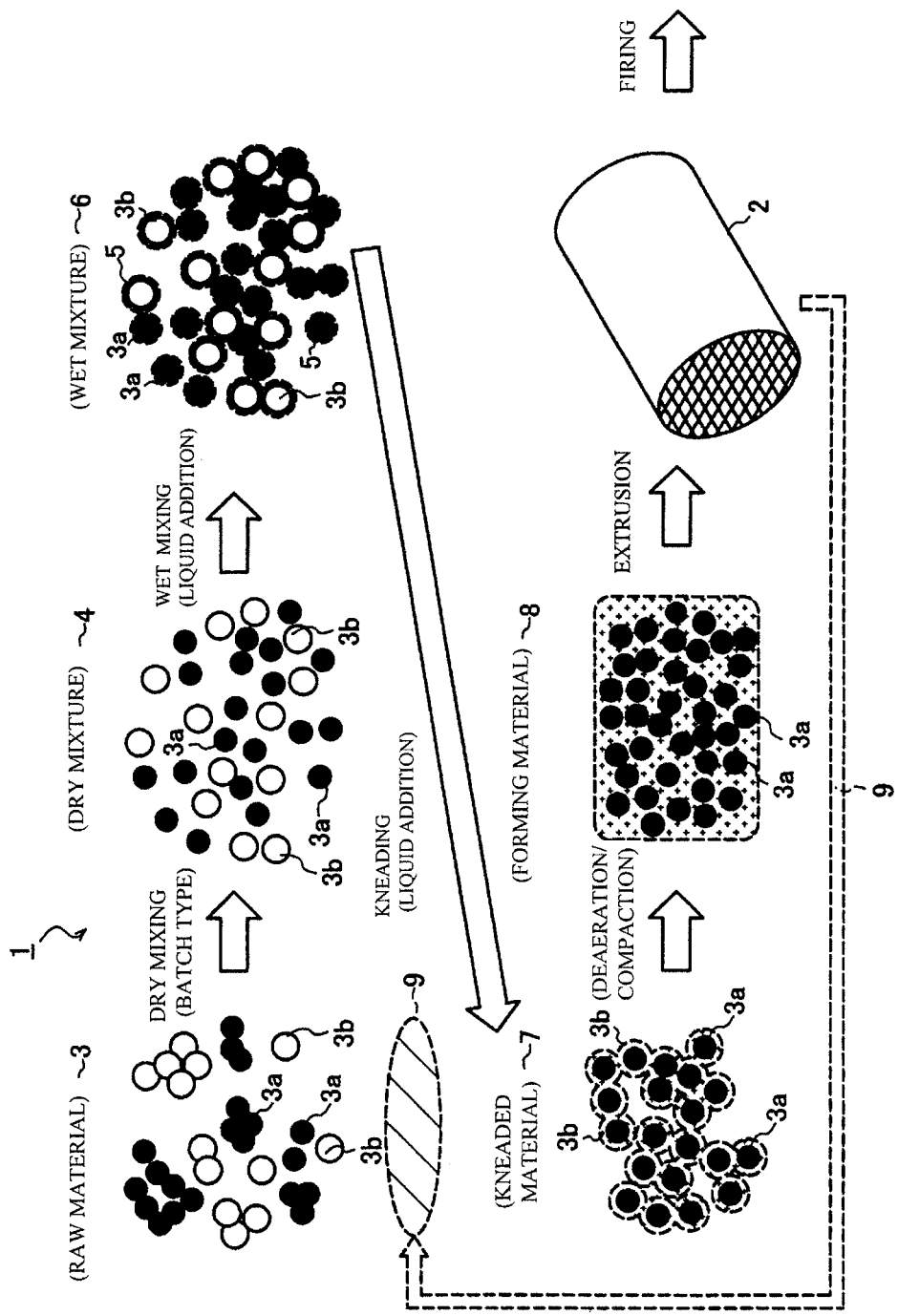
FIG. 2 is an explanatory view schematically showing a conversion process from a raw material to a forming material and a flow of formation of a honeycomb formed body from the forming material.

Consequently, the raw material 3 is converted to the dry mixture 4 in which the plurality of types of ceramic powder bodies 3a and others are uniformly dispersed (see FIG. 2). It is to be noted that FIG. 2 is a schematic view showing the dry-mixed dry mixture 4, the forming material 8 and others, shows the used forming material 9 as a part in the ceramic powder bodies 3a, and does not especially distinguish the used forming material. Therefore, drawing of the used forming material 9 is omitted after the dry mixing.

Here, in the manufacturing method 1 of the present embodiment, a reuse ratio indicating a mass ratio of the used forming material 9 in a total amount of the dry mixture 4 can be set to, for example, a range of 20 mass % to 60 mass %. As a result, the used forming material 9 recovered after the forming step S4 is performed is almost completely usable, and the forming material 8 is not wasted. At this time, when the reuse ratio of the used forming material 9 heightens, a lot of agglomerates might be generated in the forming material 8 as described above. The defect that the agglomerates are generated in this way can be eliminated by adjusting a ratio of an amount of the liquid 5 to be added, or the like in the wet mixing step S2 and the liquid re-adding step S5 of the kneading step S3 as follows (details will be described later).

The obtained dry mixture 4 is sent to the wet mixing step S2. Here, the wet mixing step S2 is performed by using the batch or continuous type of wet mixing section 20 (the batch mixer or a continuous mixer) which performs wet mixing of the dry mixture 4 by the batch treatment or the continuous treatment. When the batch type of wet mixing section 20 is used, the dry mixing section 10 is utilizable as it is after the dry mixing is performed. In this case, the liquid 5 is thrown inside at a prescribed ratio of the amount of the liquid to be added, and then, the dry mixture 4 is mixed with the liquid 5 by use of the above stirring mechanism. On the other hand, when the continuous type of wet mixing section 20 is used, the dry mixture 4 mixed in the dry mixing section 10 is gradually thrown into the wet mixing section 20 at a prescribed throw-in ratio, and the liquid 5 is simultaneously thrown inside, to perform the wet mixing in the stirring mechanism (not shown). Consequently, the dry mixture 4 is converted to the wet mixture 6 in which the dry mixture and the liquid 5 are uniformly dispersed and mixed.

In the manufacturing method 1 of the present embodiment and the honeycomb formed body manufacturing device 100, the ratio of the amount of the liquid 5 to be added in the wet mixing step S2 (the wet mixing section 20) (the ratio of the liquid to be added) is determined from a relation between this ratio and an after-mentioned ratio of the amount of the liquid 5 to be added in the kneading step S3 (the kneading section 30). Specifically, a total of the amount of the liquid 5 to be added in the wet mixing step S2 and the amount of the liquid 5 to be added in the kneading step S3 (the liquid re-adding step S5) is adjusted to match a prescribed total amount of the liquid 5 to be added to the forming material 8.

In the manufacturing method 1 of the present embodiment, the ratio of the amount of the liquid 5 to be added in the liquid re-adding step S5 (the kneading step S3) can be set to a range of 2 mass % to 10 mass %, when a ratio of a total amount of the dry mixture 4 is 100%.

Here, in the manufacturing method 1 of the present embodiment, the total of the ratio of the amount of the liquid 5 to be added in the wet mixing step S2 and the ratio of the amount of the liquid 5 to be added in the liquid re-adding step S5 is set to a range of 25 mass % to 35 mass %, when the ratio of the total amount of the dry mixture 4 is 100%. As described above, the total of the ratios of the amounts of the liquid 5 to be added is adjusted to match the prescribed total, and hence, the ratio of the amount of the liquid 5 to be added in the wet mixing step S2 is set to a range of 15 mass % to 33 mass % in the manufacturing method 1 of the present embodiment. At this time, the ratio of the amount of the liquid 5 to be added in the liquid re-adding step S5 is set to be lower than the ratio of the amount of the liquid 5 to be added in the wet mixing step S2. This is because the liquid re-adding step S5 is performed immediately prior to the forming step S4, and the liquid 5 is added for the purpose of achieving fine adjustment of the viscosity or the like of the forming material 8. In particular, the used forming material 9 is used in a part of the raw material 3, and hence, the ratio of the amount of the liquid 5 to be added in the wet mixing step S2 is suppressed, to inhibit the generation of the agglomerates in the stage of the wet mixture 6. Furthermore, in the stage of the forming material 8, the liquid 5 is added again, and hence, the viscosity is adjustable.

Afterward, the kneading step S3 is performed by using the kneading section 30 (a kneader). In the manufacturing method 1 of the present embodiment, the kneading step S3 and the next step of the forming step S4 are continuously integrally performed. That is, in the honeycomb formed body manufacturing device 100, the wet mixture 6 sent from the wet mixing section 20 is kneaded in the kneading section 30, and furthermore, the treated kneaded material 7 (the forming material 8) is directly sent to the extrusion forming section 40 which is continuously constituted integrally with the kneading section 30. Then, the forming material 8 is extruded through an extruding die of the extrusion forming section 40 (FIG. 1). Consequently, the honeycomb formed body 2 is formed (see FIG. 1 or FIG. 2).

In the manufacturing method 1 of the present embodiment, as described above, the kneading step S3 further includes the liquid re-adding step S5 of further adding the liquid 5 in a process of kneading the wet mixture 6. That is, in a preparation process of converting the raw material 3 to the forming material 8, an opportunity to add the liquid 5 is provided twice. As described above, the ratio of the amount of the liquid 5 to be added in the liquid re-adding step S5 can be set to the range of 2 mass % to 10 mass %, when the ratio of the total amount of the dry mixture 4 is 100%.

The forming material 8 obtained by deaerating and compacting the kneaded material 7 is sent to the extrusion forming section 40 (=the extruder), and extruded at a predetermined extrusion pressure and an extrusion speed (the forming step S4). It is to be noted that a step of the extruder or the like corresponding to the extrusion forming section 40 is well known, and hence, detailed description thereof is omitted here.

As described above, according to the manufacturing method 1 of the present embodiment, the liquids 5 are addable to the dry mixture 4 and the wet mixture 6 in two steps or constitutions of the wet mixing step S2 (the wet mixing section 20) and the kneading step S3 (the kneading section 30), respectively, and the forming material 8 to be extruded can be homogenized. Furthermore, a torque of the extruder in extruding the forming material 8 can be stabilized.

Especially, in the manufacturing method 1 of the present embodiment, the used forming material 9 in which the agglomerates are easily generated is used as a part of the raw material 3 at a high reuse ratio, and hence it is more difficult to prepare the forming material 8 than usual. To eliminate this problem, the liquid 5 is added in two stages, so that the generation of the agglomerates is inhibited, and the preparation of the forming material 8 having a stabilized viscosity or the like is facilitated. As a result, it is possible to stabilize flow properties of the forming material 8 and shape retaining properties of the honeycomb formed body 2, and it is possible to acquire a suitable formed body shape such as a suitable roundness.

Furthermore, the reuse ratio of the used forming material 9 can be set to be high, and hence, the total amount of the used forming material 9 to be recovered in and after the forming step S4 is completely usable. As a result, it is possible to suppress raw material cost.

EXAMPLES

Hereinafter, description will be made as to a manufacturing method of a honeycomb structure of the present invention on the basis of the following examples, but the manufacturing method of the honeycomb structure of the present invention is not limited to these examples.

1. Preparation of Forming Material (Examples 1 to 5 and Comparative Examples 1 and 2

A forming material (a kneaded material) having an extrudable viscosity was prepared by using the above-mentioned honeycomb formed body manufacturing device and by using cordierite (corresponding to ceramic powder bodies) as a main component. Here, in Examples 1 to 3, a reuse ratio of the above-mentioned used forming material was set to 20%, and a ratio of an amount of a liquid to be added in a wet mixing step (hereinafter referred to as "a ratio of the liquid to be added") was decreased from a usual ratio as much as −2% (Example 1), −4% (Example 2) and −6% (Example 3). On the other hand, in a kneading step (a liquid re-adding step), the liquid was added to the forming material (a kneaded material) immediately prior to extrusion at ratios of the liquid to be added which were +2% (Example 1), +4% (Example 2) and +6% (Example 3). Additionally, in Comparative Example 1, a reuse ratio was set to 20%, and a liquid to be added to the forming material was all thrown inside in a wet mixing step.

On the other hand, in Examples 4 and 5, a reuse ratio of a used forming material was set to 40%, and a ratio of a liquid to be added in a wet mixing step was decreased from a usual ratio as much as −4% (Example 4) and −6% (Example 5). On the other hand, in a kneading step (a liquid re-adding step), the liquid was added to a forming material (a kneaded material) immediately prior to extrusion at ratios of the liquid to be added which were +4% (Example 4) and +6% (Example 5). Additionally, in Comparative Example 2, a reuse ratio was set to 40%, and a liquid to be added to the forming material was all thrown inside in a wet mixing step. Each of the prepared forming materials was extruded from an extruder, and a substantially round pillar-shaped honeycomb formed body was obtained.

2. Evaluation of Presence Ratio of Agglomerates

In a process of preparing each of the forming materials of Examples 1 to 5 and Comparative Examples 1 and 2, about 500 g of test piece was sampled in each of the wet mixing step and the kneading step. Then, a mass of the sampled test piece was measured. Next, a sieving operation of throwing the sampled test piece into the sieve and vibrating the test piece was performed by using "a sieve" having a mesh diameter of 5 mm. A mass of "a sieve remaining test piece" which remained in the sieve was measured after the sieving operation was performed. Next, a sieving operation of throwing "a primary pass test piece" passed through the sieve having the mesh diameter of 5 mm into a sieve having a mesh diameter of 2 mm and vibrating the test piece was performed in the same manner as in the above-mentioned sieving operation. Then, a mass of "a secondary pass test piece" passed through the sieve having the mesh diameter of 2 mm was measured. Here, "the sieve remaining test piece" is a forming material having a size of 5 mm or more, "a primary remaining test piece (the primary pass test piece– the secondary pass test piece)" which remains in the sieve having the mesh diameter of 2 mm is a forming material having a size which is in excess of 2 mm and less than 5 mm, and "the secondary pass test piece" is a forming material having a size of 2 mm or less. A presence ratio of agglomerates was obtained from a value obtained by dividing the mass of "the sieve remaining test piece", "the primary remaining test piece" and "the secondary pass test piece" by a mass of the sampled test piece. A graph (FIG. 3) indicates the presence ratio of the agglomerates in the test piece during the wet mixing step, and a graph (FIG. 4) shows the presence ratio of the agglomerates in the test piece during the kneading step.

Figure 3:
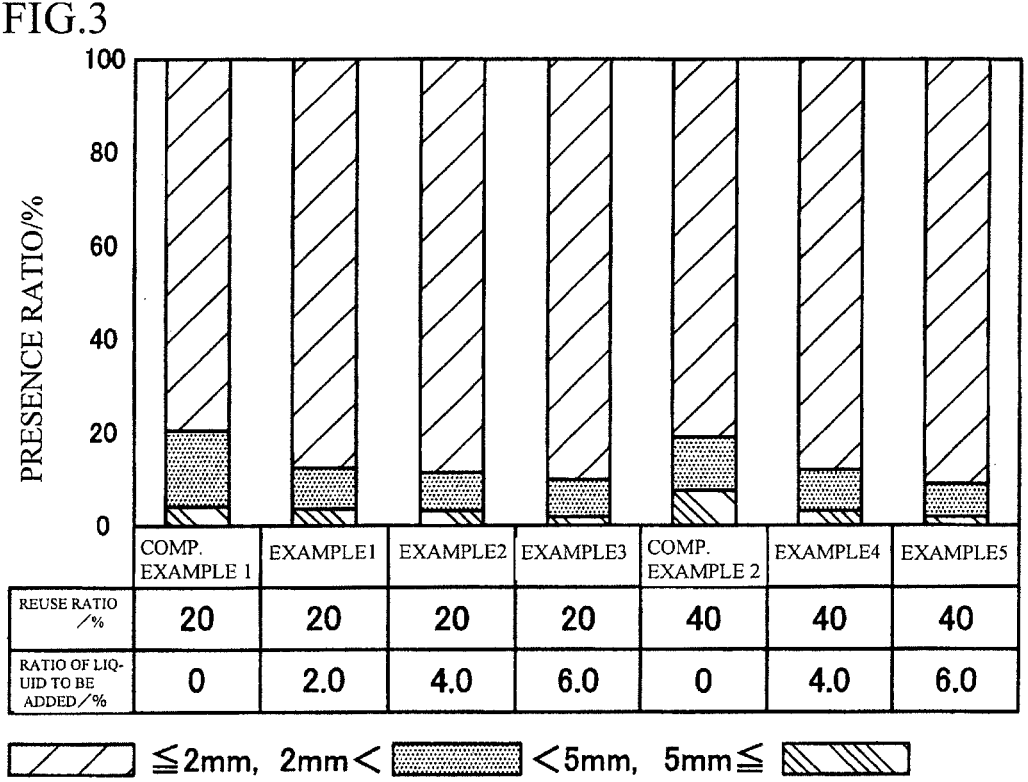
FIG. 3 is a graph showing a presence ratio of agglomerates in accordance with differences in reuse ratio of a used forming material and a ratio of a liquid to be added.
Figure 4:
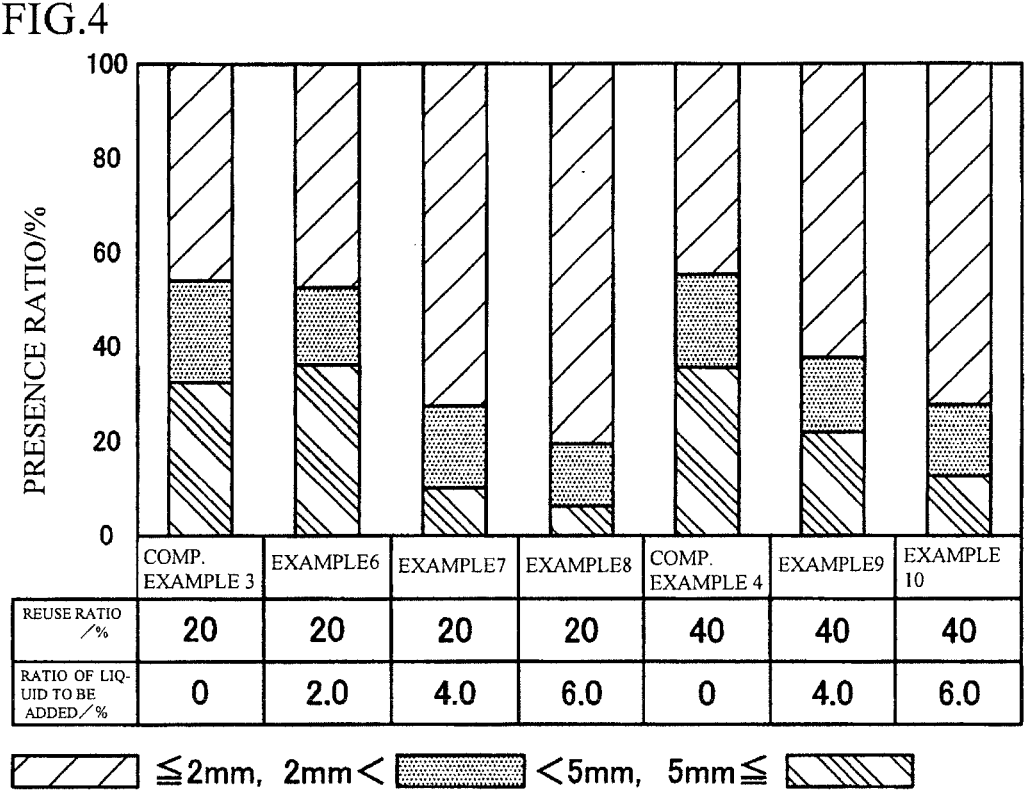
FIG. 4 is another graph showing the presence ratio of the agglomerates in accordance with the differences in reuse ratio of the used forming material and in ratio of the liquid to be added.

As shown in FIG. 3, when the reuse ratio was 20%, there was recognized the tendency that the presence ratio of large agglomerates (5 mm or more) gradually decreased, as the ratio of the liquid to be added heightened in the liquid re-adding step. Similarly, also when the reuse ratio was 40%, a similar tendency was recognized. Furthermore, in the case of the forming material passed through the liquid re-adding step and sent to the kneading step, decrease of the presence ratio of the large agglomerates is especially remarkably shown. Consequently, when the liquid is added in two stages as in the honeycomb structure of the present invention, it is possible to especially inhibit the generation of the large agglomerates. In consequence, when the liquid is added twice, i.e., in the wet mixing step and the kneading step, it is possible to effectively inhibit the generation of the agglomerates.

3. Evaluation of Torque

Figure 5:
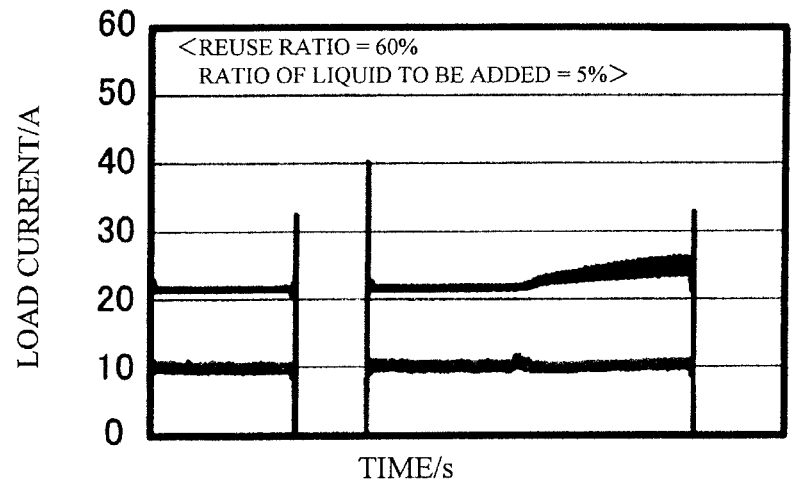
FIG. 5 is a graph showing a correlation between a load current of a main shaft of a mixer and a time (elapsed time)
Figure 6:
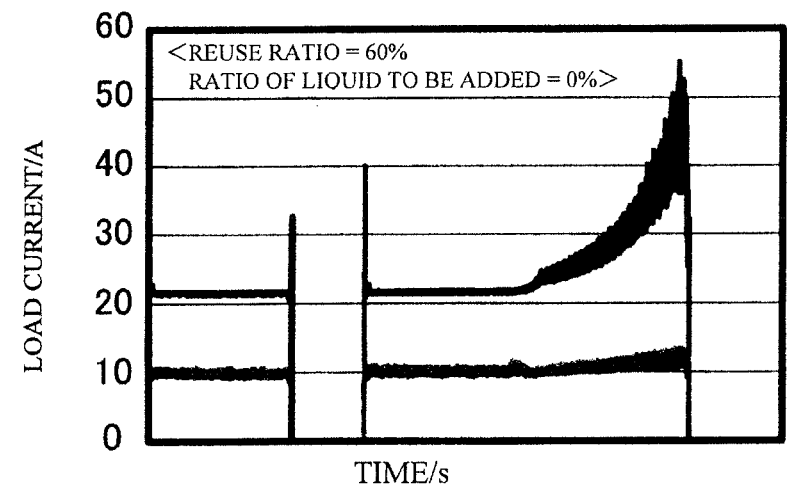
FIG. 6 is a graph showing a correlation between the load current of the main shaft of the mixer and the time (elapsed time)
Figure 7:
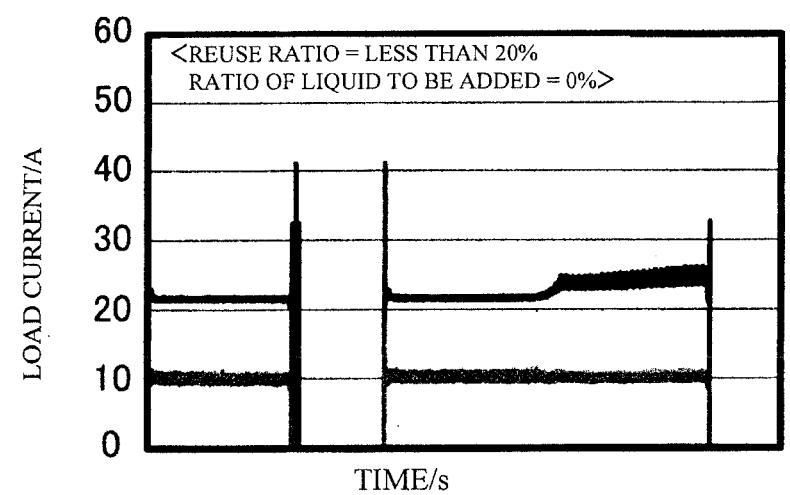
FIG. 7 is a graph showing a correlation between the load current of the main shaft of the mixer and the time (elapsed time).

A data collection device was attached to a rotating main shaft of a mixer, and a load (a load current) of a motor to rotate the main shaft during kneading with an extrusion screw was measured. Here, when the load current increases or when the load current strongly fluctuates, it is indicated that a lot of agglomerates are generated in the forming material to be extruded, and it is indicated that it is necessary to rotate the main shaft with a stronger force. Here, FIG. 5 is a graph showing a correlation between the load current of the mixer and a time (elapsed time), when the reuse ratio of the used forming material is 60%, and 5% of liquid is added in the kneading step. Similarly, FIG. 6 is a graph showing a correlation between the load current of the mixer and the time (elapsed time), when the reuse ratio of the used forming material is 60% and the liquid is not added in the kneading step. FIG. 7 is a graph showing a correlation between the load current of the mixer and the time (elapsed time), when the reuse ratio of the used forming material is less than 20% and the liquid is not added in the kneading step.

Initially, in comparison of the graphs of FIG. 6 and FIG. 7, it is indicated that when the liquid is not added during the kneading step and the reuse ratio is high, the load current of the mixer heightens in accordance with elapse of the time. That is, when the kneading continues for a long time, the load current of the forming material having a high reuse ratio heightens. In other words, it is indicated that a lot of agglomerates are easily generated. It is to be noted that the reuse ratio which is less than 20% (FIG. 7) is a limit when the used forming material is used in a conventional manner, and any practical problems do not occur. However, as shown in FIG. 6, in the forming material for which the load current rapidly increases in accordance with the elapse of the time, a load to be applied to the mixer is excessively high, it is therefore difficult to stabilize an extrusion speed or the like, and hence, the extrusion cannot practically be performed on such conditions.

On the other hand, even when the reuse ratio of the used forming material is 60% but about 5% of liquid is added during the kneading step as shown in FIG. 5, it is indicated that a value of the load current to be applied to the main shaft of the mixer does not noticeably increase, and it is possible to perform stabilized extrusion. As a result, it has been seen that it is possible to perform the extrusion of the honeycomb formed body in a state where the generation of large agglomerates is inhibited.

As described above, according to the manufacturing method of the honeycomb structure of the present embodiment, the liquid is added in two stages, i.e., in the wet mixing step and the kneading step, so that it is possible to inhibit the generation of the agglomerates in the forming material. Therefore, it is possible to heighten the reuse ratio of the used forming material, though it has heretofore been difficult to heighten the ratio, and the reuse ratio can be heightened up to about 60% at maximum. As a result, heretofore a part of the forming material has been discarded, but it is possible to eliminate the problem that a part of the forming material is wasted. Furthermore, when the generation of the agglomerates is inhibited, it is possible to stably perform the extrusion of the honeycomb formed body, a formed body shape of the honeycomb formed body and a product shape of the honeycomb structure can be stabilized, and it is possible to manufacture the honeycomb structure which maintains a suitable quality.

A manufacturing method of a honeycomb structure of the present invention is usable in manufacturing a honeycomb formed body which is utilizable in a car exhaust gas purifying catalyst carrier, a diesel particulate removing filter, a heat reservoir for a burning device, or the like.

DESCRIPTION OF REFERENCE NUMERALS

1: manufacturing method (the manufacturing method of a honeycomb structure), 2: honeycomb formed body, 3: raw material, 3a: ceramic powder body, 3b: binder, 4: dry mixture, 5: liquid, 6: wet mixture, 7: kneaded material, 8: forming material, 9: used forming material, 10: dry mixing section, 20: wet mixing section, 30: kneading section, 40: extrusion forming section, 100: honeycomb formed body manufacturing device, S1: dry mixing step, S2: wet mixing step, S3: kneading step, S4: forming step, and S5: liquid re-adding step.

What is claimed is:

1. A manufacturing method of a honeycomb structure comprising:

a dry mixing step of dry-mixing raw materials to form the honeycomb structure by a batch treatment, a wet mixing step of adding a liquid including at least one selected from the group consisting of water, a surfactant, a lubricant and a plasticizer to a dry mixture obtained in the dry mixing step, to perform wet mixing, wherein the wet mixing step is performed by a batch treatment, a kneading step of kneading a wet mixture obtained in the wet mixing step, and a forming step of extruding a forming material prepared in the kneading step into a honeycomb structure, wherein in the dry mixing step, a used forming material passed through the forming step is added as a part of the raw material, to perform dry mixing, and the kneading step includes a liquid re-adding step of further adding the liquid in a process of kneading the wet mixture.

2. The manufacturing method of the honeycomb structure according to claim 1, wherein a reuse ratio indicating a mass ratio of the used forming material in a total amount of the dry mixture is in a range of 20 mass % to 60 mass %.

3. The manufacturing method of the honeycomb structure according to claim 1, wherein a ratio of an amount of the liquid to be added in the liquid re-adding step is in a range of 2 mass % to 10 mass % of a total amount of the liquid added in the wet mixing step and the liquid re-adding step, when a ratio of a total amount of the dry mixture is 100 mass %.

* * * * *